United States Patent
Kim (10) Patent No.: US 8,430,240 B2
(45) Date of Patent: Apr. 30, 2013

(54) CASE FOR BAR TYPE MOBILE ELECTRONIC DEVICE

(75) Inventor: Dae-Young Kim, Seoul (KR)

(73) Assignee: Spigen SGP Co., Ltd., Seoul (KR)

( * ) Notice: Subject to any disclaimer, the term of this patent is extended or adjusted under 35 U.S.C. 154(b) by 0 days.

(21) Appl. No.: 13/188,885

(22) Filed: Jul. 22, 2011

(65) Prior Publication Data

US 2012/0018325 A1  Jan. 26, 2012

(30) Foreign Application Priority Data

Jul. 26, 2010 (KR) ........................ 10-2010-0071844

(51) Int. Cl.
*B65D 85/00* (2006.01)

(52) U.S. Cl.
USPC ........................................ 206/320; 455/575.8

(58) Field of Classification Search .................. 206/305, 206/320, 580, 453; 455/575.1, 575.8; 379/428.01
See application file for complete search history.

(56) References Cited

U.S. PATENT DOCUMENTS

| | | | | |
|---|---|---|---|---|
| 5,360,108 A | * | 11/1994 | Alagia | 206/320 |
| 5,392,920 A | * | 2/1995 | Prete | 206/586 |
| 7,495,895 B2 | * | 2/2009 | Carnevali | 361/679.26 |
| 7,594,576 B2 | * | 9/2009 | Chen et al. | 206/320 |
| 7,647,082 B2 | * | 1/2010 | Holmberg | 455/575.8 |
| 7,663,879 B2 | * | 2/2010 | Richardson et al. | 361/679.56 |
| 7,938,260 B2 | * | 5/2011 | Lin | 206/320 |
| 2005/0139498 A1 | * | 6/2005 | Goros | 206/320 |
| 2008/0039161 A1 | * | 2/2008 | Chan | 455/575.8 |
| 2008/0076486 A1 | * | 3/2008 | Chan | 455/575.1 |
| 2010/0096284 A1 | * | 4/2010 | Bau | 206/320 |
| 2011/0253569 A1 | * | 10/2011 | Lord | 206/320 |
| 2012/0031788 A1 | * | 2/2012 | Mongan et al. | 206/320 |

* cited by examiner

*Primary Examiner* — David Fidei
(74) *Attorney, Agent, or Firm* — Jefferson IP Law, LLP (57) ABSTRACT

A case for a bar type mobile electronic device is provided. The case includes a main body and an auxiliary body. The main body includes a periphery part and guide parts. The periphery part wraps the sides of the mobile electronic device. The guide parts cover parts of the front and back of the mobile electronic device. The guide parts are extended in the direction where the mobile electronic device is located at both opposite edges of the periphery part. The auxiliary body wraps the outer surface of the periphery part. The auxiliary body applies pressure to the main body in the direction of the mobile electronic device. The auxiliary body assists the main body to couple to the mobile electronic device, so that the case cannot be easily removed from the mobile electronic device and can protect the mobile electronic device from scratches and external impact.

7 Claims, 5 Drawing Sheets

CASE FOR BAR TYPE MOBILE ELECTRONIC DEVICE

PRIORITY

This application claims the benefit under 35 U.S.C. §119 (a) of a Korean patent application filed on Jul. 26, 2010 in the Korean Intellectual Property Office and assigned Serial No. 10-2010-0071844, the entire disclosure of which is hereby incorporated by reference.

BACKGROUND OF THE INVENTION

1. Field of the Invention

This invention relates to cases. More particularly, the present invention relates to a case that includes a main body for wrapping the sides, part of the front, and part of the back of a mobile electronic device, and an auxiliary body for wrapping the outer surface of the main body, so that it can be stably and securely installed to the mobile electronic device without being removed therefrom.

2. Description of the Related Art

Mobile electronic devices, such as mobile phones, PDAs, DMBs, etc. are widely used by people. For example, mobiles phones have been developed to provide a variety of additional functions, such as a video playback, an audio playback, a digital camera function, a DMB function, a navigation function, an Internet function, etc., as well as a call function. In addition, mobile phones are designed to be attractive in appearance and shape. Mobile phones have also been developed with a touch screen on their front side, which increases their cost.

Users handle their expensive mobile phones carefully so as not to scratch, damage, or break them. Moreover, they also decorate their mobile phones to enhance their appearance.

In order to comply with user's requests, i.e., to prevent the mobile electronic devices from being damaged and decorating the mobile electronic device to be attractive, various types of cases and cases made of various materials for mobile electronic devices have been developed and sold on the market. Conventional cases for bar type mobile electronic devices can be divided into two types as follows.

One type of case is made of soft materials such as silicon, urethane, etc. These soft cases are coupled to mobile electronic devices by receiving and covering the side and back using their elasticity feature. Since mobile electronic devices are inserted into the soft cases, they are not subject to pressure from the soft cases themselves and become scratched during the coupling process. However, the soft cases do not protect the mobile electronic devices from strong external impact. In addition, since the soft cases are not tightly coupled to the mobile electronic devices, they may be frequently removed from the mobile electronic devices, which make users feel inconvenienced.

The other type of case is a hard case made of metal or synthetic resin. Hard cases are shaped as a container where the side member and the back member are integrally formed, so that they can receive mobile electronic devices and protect the side and back. Since the hard cases are relatively tightly coupled to mobile electronic devices, their coupling is stable. However, most hard cases must have additional parts therein, such as protrusions, in order to fix mobile electronic devices therein. In that case, these additional parts may scratch mobile electronic devices when the mobile electronic devices are inserted into the hard cases. In addition, when the mobile electronic devices installed to the hard cases are being used, hard cases made of hard materials scratch the sides and back of the mobile electronic device.

Therefore, a case is required with a structure that can safely protect bar type mobile electronic devices against damage such as scratches etc. and can provide high endurance performance.

SUMMARY OF THE INVENTION

Aspects of the present invention are to address the above-mentioned problems and/or disadvantages and to provide at least the advantages described below. Accordingly, an aspect of the present invention is to provide a case that includes a main body for wrapping the sides, part of the front, and part of the back of a mobile electronic device, and an auxiliary body for wrapping the outer surface of the main body, so that it can be stably and securely installed to the mobile electronic device without being removed therefrom.

In accordance with an aspect of the present invention, a case for a mobile electronic device is provided. The case includes a main body and an auxiliary body, where the main body wraps the entire side of the mobile electronic device and wraps parts of the front and back of the mobile electronic device, and the auxiliary body wraps the outer surface of the main body, so that it cannot be easily removed from the mobile electronic device and instead can be firmly coupled thereto.

In accordance with an aspect of the present invention, a case for a mobile electronic device is provided. The case includes a main body and an auxiliary body, where the main body forms a receiving groove on the outer surface that is depressed in the direction where the mobile electronic device is located and receives the auxiliary body, so that the main body and the auxiliary body can be more stably coupled to each other.

In accordance with an aspect of the present invention, a case for a mobile electronic device is provided. The case includes a main body and an auxiliary body, where the receiving groove and the auxiliary body form the first and second chamfers respectively, so that the auxiliary body can be smoothly fitted into the receiving groove.

In accordance with an aspect of the present invention, a case for a mobile electronic device is provided. The case includes a main body and an auxiliary body, where the main body forms a number of coupling protrusions on the outer surface and the auxiliary body forms a number of coupling grooves on the inner wall, so that, when the coupling grooves receive the coupling protrusions, the main body and the auxiliary body can be stably coupled to each other.

In accordance with an aspect of the present invention, a case for a mobile electronic device is provided. The case includes a main body with coupling protrusions and an auxiliary body with coupling grooves, where the coupling protrusions and the coupling grooves have tapers and corresponding tapers at their end portions, respectively, so that the coupling protrusions can be smoothly inserted into the coupling grooves when the main body and the auxiliary body are coupled to each other.

In accordance with an aspect of the present invention, a case for a mobile electronic device is provided. The case includes a main body and an auxiliary body, where the main body includes a bottom plate for covering the back of the mobile electronic device, so that it can protect the entire side and the back of the mobile electronic device against external damage.

In accordance with an exemplary embodiment of the invention, a case for a bar type mobile electronic device is provided.

The case includes a main body and an auxiliary body. The main body includes a periphery part for wrapping the sides of the mobile electronic device and guide parts for covering parts of the front and back of the mobile electronic device. The guide parts are extended in the direction where the mobile electronic device is located at both opposite edges of the periphery part. The auxiliary body wraps the outer surface of the periphery part.

Preferably, the main body may further form a receiving groove on the outer surface that is depressed in the direction where the mobile electronic device is located, with a width corresponding to that of the auxiliary body. The receiving groove receives the auxiliary body.

Preferably, the receiving groove forms first chamfers by rounding both opposite edges of the periphery part. The auxiliary body forms second chamfers by rounding both opposite edges to be fitted into the receiving groove. The first and second chamfers guide the auxiliary body to the receiving groove.

Preferably, the periphery part forms coupling protrusions on the outer surface corners, with a certain distance in the thickness direction of the main body. The auxiliary body forms coupling grooves on the inner wall, at positions corresponding to the coupling protrusions. The main body and the auxiliary body are slid and coupled to each other in a state where the coupling protrusions match the coupling grooves in positions.

Preferably, each of the coupling protrusions forms a first taper at the end portion that is beveled. Each of the coupling grooves form a second taper at the end portion that is beveled. The first and second tapers are formed correspondingly to be coupled to each other.

Preferably, the main body may further comprise a bottom plate for covering the back of the mobile electronic device.

Preferably, the main body is made of silicon or urethane, and the auxiliary body is made of polycarbonate.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

BRIEF DESCRIPTION OF SYMBOLS IN THE DRAWINGS

1: mobile electronic device
100: main body
110: periphery part
111: receiving groove
111a: first chamfer
112: coupling protrusion
112a: first taper
113: protrusions
120: guide part
130: bottom plate
150: through-hole
200: auxiliary body
211a: second chamfer
212: coupling groove
212a: second taper
213: opening

DETAILED DESCRIPTION OF EXEMPLARY EMBODIMENTS

The following description with reference to the accompany drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The case for a mobile electronic device, according to the invention, includes a main body 100 made of soft materials and an auxiliary body 200 made of hard materials, which are coupled to each other. The case is installed to a mobile electronic device 1, surrounding the sides. The auxiliary body 200 with a characteristic of elasticity is coupled to the main body 100 that is coupled to the mobile electronic device 1, thereby adding its coupling power to the main body 100. Therefore, the case cannot be easily removed from the mobile electronic device 1.

In the following description, the term 'front' and 'back' refer to the front of the display panel of the mobile electronic device 1 and the back of the mobile electronic device 1. In addition, the term 'periphery side' refers to the four sides of the mobile electronic device 1 between the front and back.

Figure 1:
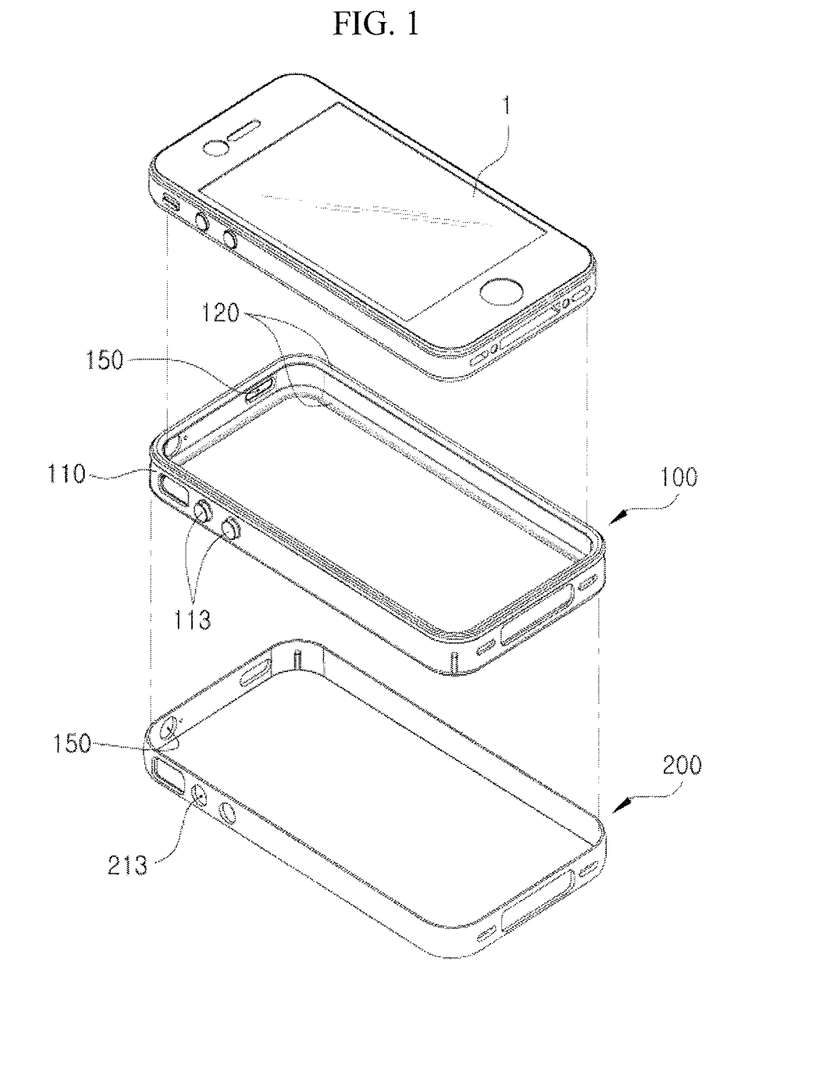
FIG. 1 is a perspective view illustrating a case for a bar type mobile electronic device according to an exemplary embodiment of the present invention.

FIG. 1 is a perspective view illustrating a case for a bar type mobile electronic device according to an exemplary embodiment of the present invention.

Figure 2:
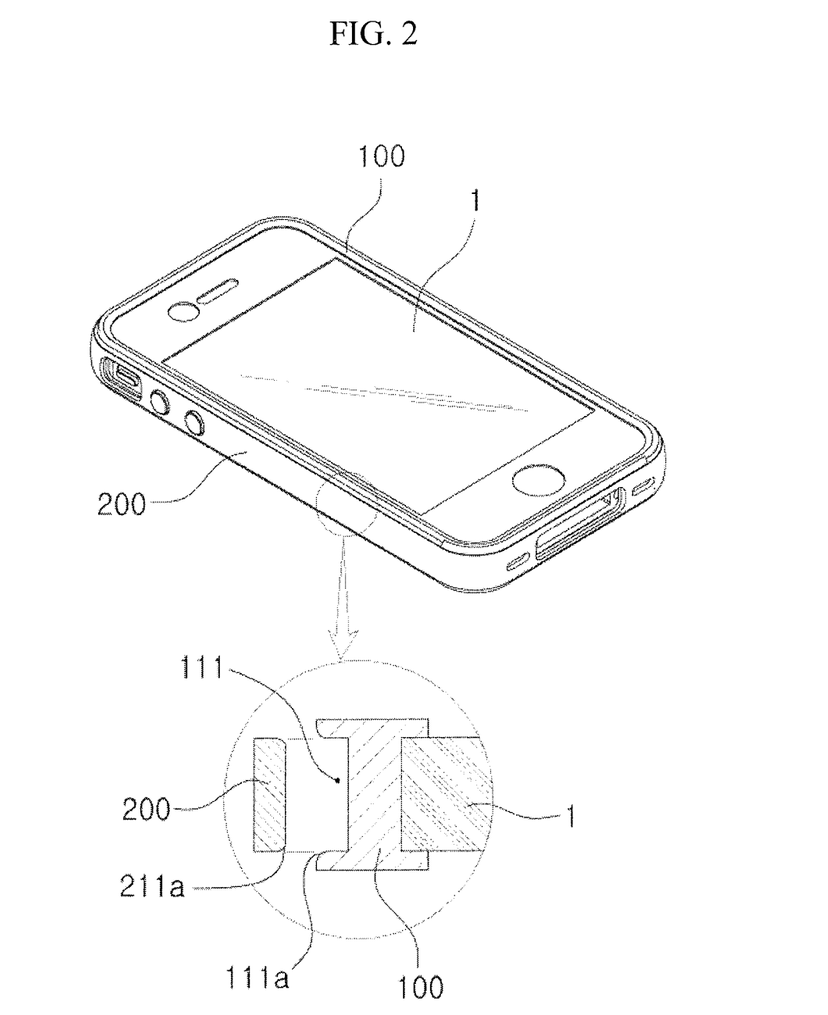
FIG. 2 is a perspective view illustrating a mobile electronic device to which a case according to an exemplary embodiment of the present invention is installed.

FIG. 2 is a perspective view illustrating a mobile electronic device to which a case according to an exemplary embodiment of the present invention is installed.

As shown in FIGS. 1 and 2, the case for a mobile electronic device includes a main body 100 and an auxiliary body 200.

The main body 100 wraps the sides and parts of the front and the back of the mobile electronic device 1. The main body 100 includes a periphery part 110 with a certain width in the thickness direction of the mobile electronic device 1, for surrounding the sides of the mobile electronic device 1. The main body 100 also includes guide parts 120 that are formed as both lengthwise edges of the periphery part 110 are bent and extended toward the center of the front and back, with a certain distance, respectively. The guide parts 120 cover parts of the front and back of the mobile electronic device 1, i.e., the zones corresponding to the distance, along the edges.

That is, the main body 100 is shaped as the Korean letter ' ' pronounced "Digeuk," by the periphery part 110 and the guide parts 120, in the cross-sectional view. The main body 100 also forms a close curve viewed from above and has a periphery length corresponding to the length of the entire side of the mobile electronic device 1. Therefore, the periphery part 110 of the main body 100 covers the entire side of the mobile electronic device 1. The guide parts 120 also cover parts of the front and back of the mobile electronic device 1, along the edge zones, without covering the display panel on the front, like a picture frame.

The main body 100 is made of soft elastic material, such as silicon, urethane, etc., so that its inner portion can closely contact the sides and parts of the front and back of the mobile electronic device 1.

The auxiliary body 200 prevents the main body 100 from easily being removed from the mobile electronic device 1 if the mobile electronic device 1 is wrapped only by the main body 100. The auxiliary body 200 is shaped as a close curve in the same as the main body 100, viewed from above, and is a little larger so that it can wrap the outer surface of the main body 100. The auxiliary body 200 also has a width less than that of the periphery part 110 of the main body 100. That is, the auxiliary body 200 wraps the outer surface of the main body 100 except for both opposite lengthwise edges, thereby supplementing the main body 100.

That is, as shown in FIG. 2, the auxiliary body 200 wraps the inner part of the periphery part 110 except for both opposite lengthwise edges.

The auxiliary body 200 must be made of a material, such as metal, synthetic resin, or the like, so that it can apply a certain level of pressure to the main body 100 and the mobile electronic device 1. It is more preferable that the auxiliary body 200 is made of a series of plastic materials that can be formed via injection molding or heat molding, for example, polycarbonate, etc.

As described above, the main body 100 and the auxiliary body 200 are shaped in such a manner that their bent portions are rounded, which provides a comfortable and easy grip and a smooth feeling to users. In addition, this rounded shape can also efficiently distribute an external impact to the mobile electronic device 1.

The main body 100 forms protrusions 113 and the auxiliary body 200 also forms openings 213 at positions corresponding to the protrusions 113, so that, when the case is installed to the mobile electronic device 1, it cannot limit the use of buttons formed at the side of the mobile electronic device 1.

The protrusions 113 are protruded and formed, toward the outside, at positions in the periphery part 110 of the main body 100, which correspond to those of the side buttons of the mobile electronic device 1, and receive them without applying pressure in a normal state. For example, when the user presses one of the protrusions 113, the pressed protrusion 113 transfers the user's applied pressure to a corresponding side button and presses it. Therefore, the protrusions 113 can serve to assist the user to operate the side buttons of the mobile electronic device 1 when the case is installed to the mobile electronic device 1.

Likewise, the openings 213 are formed, at the positions corresponding to those of the protrusions 113 in the auxiliary body 200, so as to have respective areas corresponding to those of the protrusions 113 to be exposed to the outside when the auxiliary body 200 is coupled to the main body 100. Therefore, the openings 213 can serve to assist the user to press the protrusions 113 exposed to the outside therethrough.

In addition, the main body 100 and the auxiliary body 200 can also form through-holes 150 at the same position, in order to expose a camera lens, a light, interface connectors, etc. of the mobile electronic device 1. Since this is well known to persons skilled in the art, a detailed description will be omitted in this application.

Referring to FIG. 2, the main body 100 is installed to the mobile electronic device 1 in such a manner that the periphery part 110 wraps the sides of the mobile electronic device 1. After that, the auxiliary body 200 wraps and is fixed around the outer surface of the periphery part 110 of the main body 100.

Since the auxiliary body 200, made of a hard material, wraps the outer surface of the main body 100 that has elasticity but lacks a coupling ability with the mobile electronic device 1, it can apply pressure to the main body 100 in the shrink direction, so that the main body 100 made of a soft material contacts the outer surface of the sides of the mobile electronic device 1. Therefore, since the mobile electronic device 1 can be wrapped by the soft main body 100, it cannot be scratched. In addition, since the main body 100 can tightly wrap the sides of the mobile electronic device 1, with the help of the auxiliary body 200, the case cannot be easily removed from the mobile electronic device 1. In particular, when an external impact is applied to the mobile electronic device 1, it can be efficiently and gradually absorbed by the case because the main body 100 and the auxiliary body 200 are made of different materials as described above.

Figure 3:
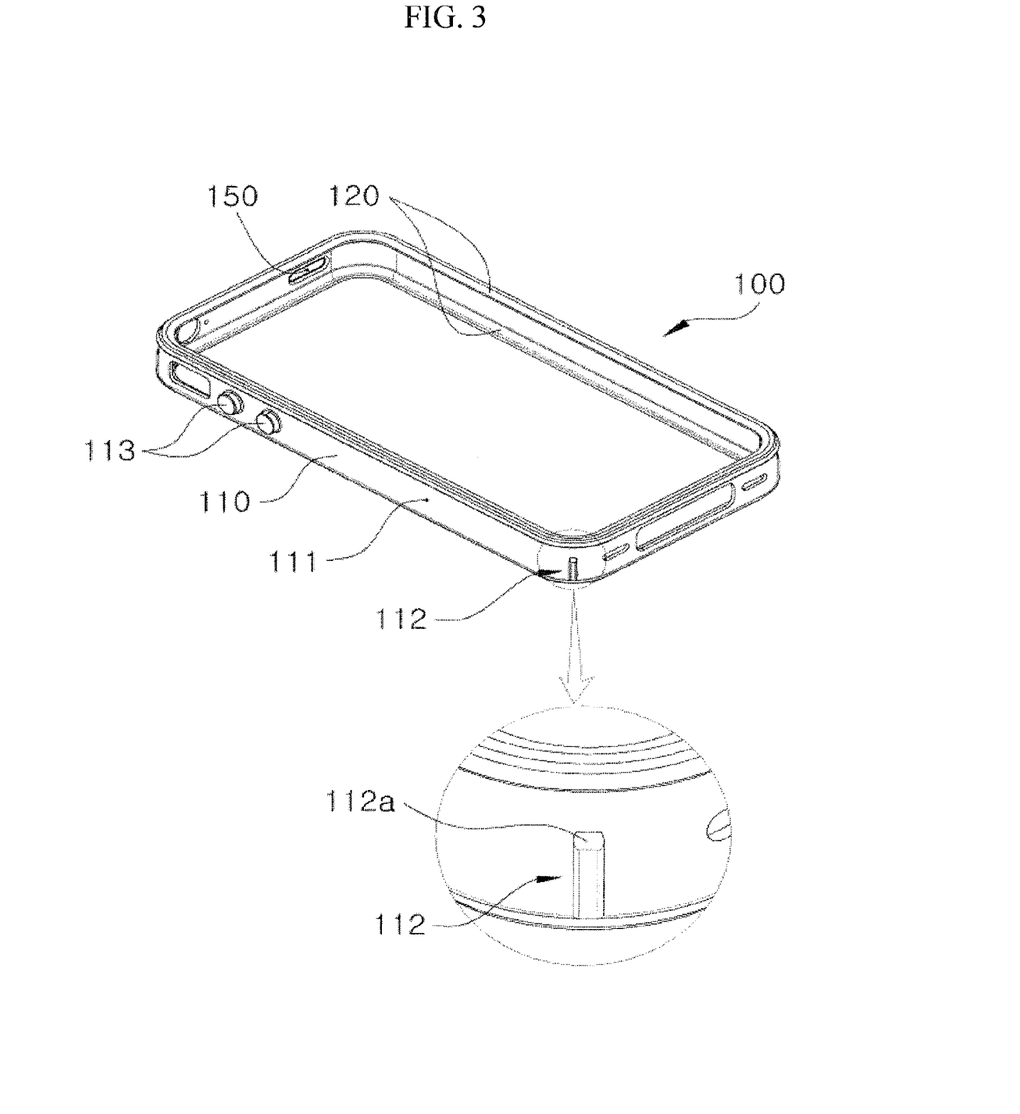
FIG. 3 is a perspective view illustrating a main body according to an exemplary embodiment of the present invention.
Figure 4:
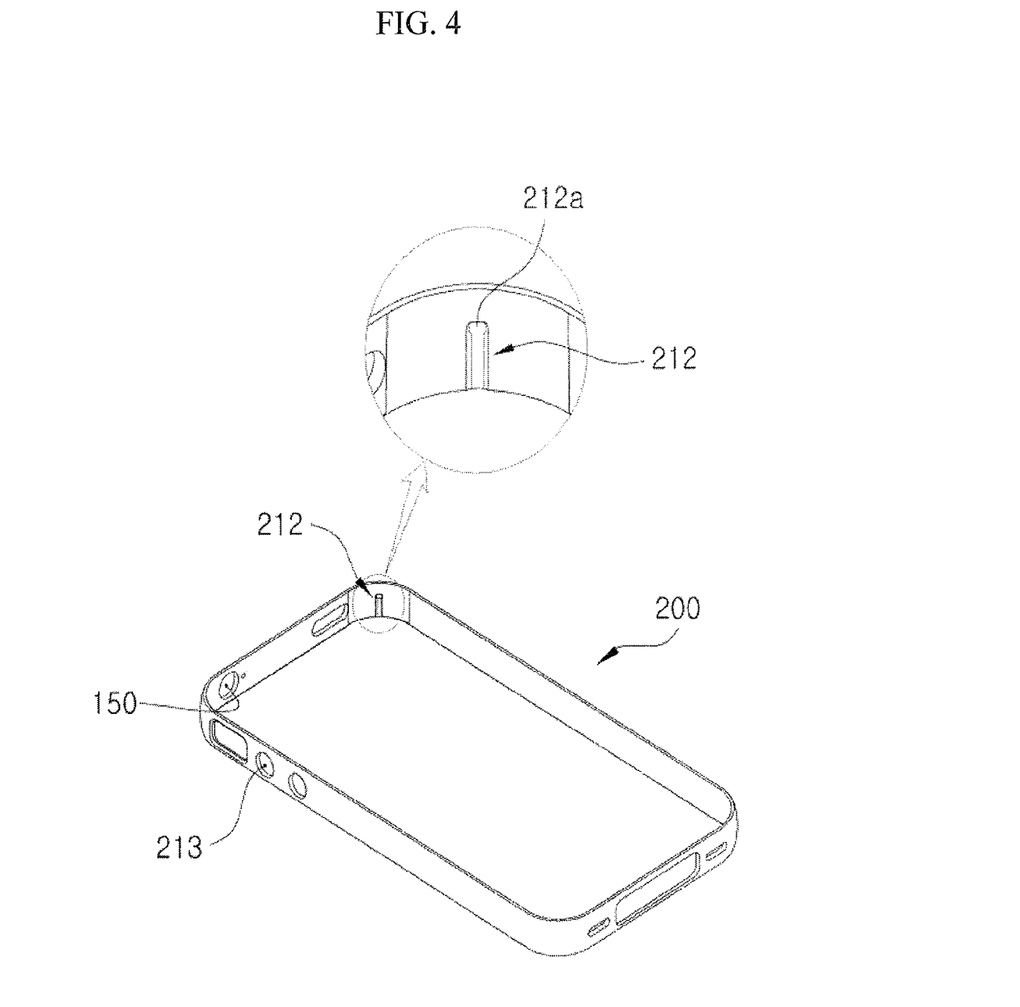
FIG. 4 is a perspective view illustrating an auxiliary body according to an exemplary embodiment of the present invention.

FIG. 3 is a perspective view illustrating a main body according to an exemplary embodiment of the present invention. FIG. 4 is a perspective view illustrating an auxiliary body according to an exemplary embodiment of the present invention.

As shown in FIG. 3, the main body 100 forms a groove 111 for receiving the auxiliary body 200 on the outer surface. The receiving groove 111 is formed in such a manner to be depressed on the outer surface of the main body 100 toward the direction where the mobile electronic device 1 is located in the main body 100, with a width corresponding to that of the auxiliary body 200.

That is, the receiving groove 111 has a width that is less than the periphery part 110 of the main body 100. The receiving groove 111 is shaped as the Korean letter ' ' pronounced "Digeuk," being depressed along the lengthwise direction of the periphery part 110, in the cross-sectional view. The receiving groove 111 is depressed with a depth corresponding to the thickness of the auxiliary body 200, so that it can completely receive the auxiliary body 200 and this allows the auxiliary body 200 and the main body 100 to be more stably and firmly coupled to each other.

The receiving groove 111 may further form first chamfers 111a to allow the auxiliary body 200 to smoothly receive thereto. In that case, correspondingly, the auxiliary body 200 may also form second chamfers 211a. Referring back to FIG. 2, the first chamfers 111a are formed by rounding both edges of the periphery part 110 along the lengthwise, at both opposite edges of the receiving groove 111. Likewise, the second chamfers 211a are formed by rounding both edges of the auxiliary body 200 to be inserted into the receiving groove 111, corresponding to the first chamfers 111a.

Therefore, the first 111a and second 211a chamfers allow the auxiliary body 200 to smoothly be inserted into the receiving groove 111 by guiding the introduction path of the auxiliary body 200 to the receiving groove 111.

In addition, as shown in FIGS. 3 and 4, the case for a bar type mobile electronic device, according to the invention, may further form coupling protrusions 112 in the receiving groove 111 of the main body 100, and, correspondingly coupling grooves 212 in the auxiliary body 200.

The coupling protrusions 112 are fitted into the coupling grooves 212 when the main body 100 and the auxiliary body 200 are coupled to each other. These make it easy to couple the main body 100 and the auxiliary body 200 and more firmly retain their coupling state.

In detail, as shown in FIG. 3, the coupling protrusions 112 are formed at the corners on the outer surface of the periphery part 110, in the thickness direction of the main body 100, starting from the back toward the front of the mobile electronic device 1. The coupling protrusions 112 each have a distance so that they do not cause an obstruction when the main body 100 is coupled to the auxiliary body 200. It is preferable that the distance of the coupling protrusions 112 is ⅔ of the thickness of the periphery part 110.

The coupling protrusions 112 may be formed in the receiving groove 111. In that case, the coupling protrusions 112 are protruded and extended at the bent portion in the thickness direction of the main body 100, starting from the back toward the front of the mobile electronic device 1.

In particular, each of the coupling protrusions 112 has a first taper 112a that is formed to be beveled at the end portion. The first taper 112a serves to be smoothly coupled to the coupling groove 212. Its detailed description will be provided later when the coupling groove 212 is described.

As shown in FIG. 4, the coupling grooves 212 are shaped so as to correspond to the coupling protrusions 112 and receive them. The coupling protrusions 112 are fitted into the coupling grooves 212. The coupling grooves 212 are formed on the inner wall of the auxiliary body 200, at positions corresponding to those of the coupling protrusions 112 of the main body 100.

When the main body 100 is installed to the mobile electronic device 1, the coupling protrusions 112 are slidably coupled to the coupling grooves 212. When the auxiliary body 200 is forcibly coupled to the main body 100, the coupling protrusions 112 and the coupling grooves 212 assist them to be easily coupled to each other. In addition, when the main body 100 and the auxiliary body 200 receive an external impact or other external force, the coupling protrusions 112 and the coupling grooves 212 can prevent them from being moved, thereby stably retaining their coupling state.

In addition, like the first taper 112a formed at the end of each coupling protrusion 112, the coupling grooves 212 each form a second taper 212a at the end portion. The second taper 212a is formed to be beveled corresponding to the shape of the first taper 112a, so that they can be properly coupled to each other.

The first 112a and second 212a tapers assist the coupling protrusions 112 and coupling grooves 212 to be smoothly coupled to each other when the main body 100 and the auxiliary body 200 are coupled to each other.

Figure 5:
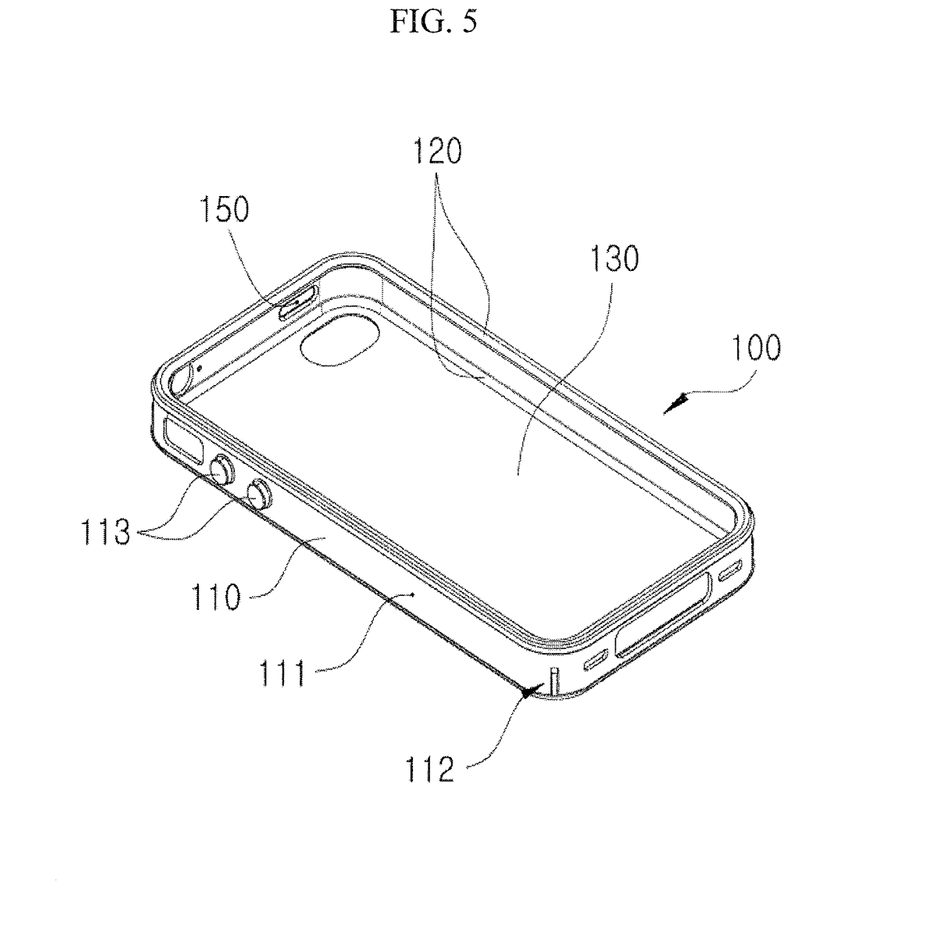
FIG. 5 is a perspective view illustrating a main body with a bottom plate, according to an exemplary embodiment of the present invention.

FIG. 5 is a perspective view illustrating a main body with a bottom plate, according to an exemplary embodiment of the present invention.

As shown in FIG. 5, the main body 100 may further include a bottom plate 130 that is located at the position to cover the back of the mobile electronic device 1 when the main body 100 is coupled to the mobile electronic device 1. That is, the bottom plate 130 extends from the guide parts 120 close to the back of the mobile electronic device 1 and covers the back of the mobile electronic device 1.

The bottom plate 130 is made of the same material as the periphery part 110 and the guide parts 120, or alternatively a material harder than these parts.

When the case for a bar type mobile electronic device is implemented to further include the bottom plate 130, it can prevent the sides and the back of the mobile electronic device 1 from being scratched and also efficiently distribute an external impact.

As described above, the case for a bar type mobile electronic device, according to the invention, has the following advantages:

1) Since it is configured to include a main body and an auxiliary body, it cannot be easily removed from the mobile electronic device.

2) Since the main body forms a receiving groove on the outer surface, it can allow the main body and the auxiliary body to be more stably coupled to each other.

3) Since the receiving groove and the auxiliary body form the first and second chamfers respectively, the auxiliary body can be smoothly fitted into the receiving groove.

4) Since the receiving groove and the auxiliary body also form the coupling protrusions and coupling grooves respectively, the coupling protrusions and coupling grooves can stably retain the coupling state between the main body and the auxiliary body.

5) Since the case is configured in such a manner that the main body includes the bottom plate, it can protect the entire side and the back of the mobile electronic device against external damage.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A case for a bar type mobile electronic device, the case comprising:
   a main body that includes a periphery part for wrapping the sides of the mobile electronic device and guide parts for covering parts of the front and back of the mobile electronic device, wherein the guide parts are extended in a direction towards the mobile electronic device at both opposite edges of the periphery part; and
   an auxiliary body for wrapping the outer surface of the periphery part,
   wherein the auxiliary body applies pressure to the main body in the direction of the mobile electronic device, and
   wherein the periphery part forms coupling protrusions on a plurality of outer surface corners, extending in a thickness direction of the main body.

2. The case of claim 1, wherein:
   the main body is made of silicon or urethane; and
   the auxiliary body is made of polycarbonate.

3. The case of claim 2, wherein the main body further forms:

a receiving groove on the outer surface, depressed in the direction where the mobile electronic device is located, with a width corresponding to that of the auxiliary body, where the receiving groove receives the auxiliary body.

4. The case of claim 3, wherein:

the receiving groove forms first chamfers by rounding both opposite edges of the periphery part; and the auxiliary body forms second chamfers by rounding both opposite edges to be fitted into the receiving groove, the first and second chamfers guide the auxiliary body to the receiving groove.

5. The case of claim 3, wherein the auxiliary body forms coupling grooves on an inner wall, at a plurality of positions corresponding to the coupling protrusions, and wherein the main body and the auxiliary body are slid and coupled to each other in a state where the coupling protrusions match the coupling grooves in positions.

6. The case of claim 5, wherein:

each of the coupling protrusions forms a first taper at the end portion that is beveled; and each of the coupling grooves form a second taper at the end portion that is beveled, the first and second tapers are formed correspondingly to be coupled to each other.

7. The case of claim 2, wherein the main body further comprises:

a bottom plate for covering the back of the mobile electronic device.

\* \* \* \* \*